United States Patent [19]

Santoro

[11] Patent Number: 4,856,581

[45] Date of Patent: Aug. 15, 1989

[54] HEAT EXCHANGER UNIT FORMED OF A PLURALITY OF MODULAR UNITS INCLUDING CONNECTION COUPLERS

[76] Inventor: Gennaro Santoro, 102 via Abbrescia, I-70121 Bari BA, Italy

[21] Appl. No.: 189,243

[22] PCT Filed: Jul. 31, 1987

[86] PCT No.: PCT/IT87/00077
§ 371 Date: Apr. 5, 1988
§ 102(e) Date: Apr. 5, 1988

[87] PCT Pub. No.: WO88/01039
PCT Pub. Date: Feb. 11, 1988

[30] Foreign Application Priority Data

Aug. 8, 1986 [IT] Italy .................. 48373 A/86

[51] Int. Cl.[4] ............................. F24H 3/00
[52] U.S. Cl. ...................... 165/130; 165/78; 165/177; 165/180; 165/905; 285/156; 285/361; 285/396
[58] Field of Search ............ 165/78, 129, 130, 137, 165/180, 905, 50, 32, 183; 285/360, 361, 376, 396, 401, 402, 156, 382

[56] References Cited

U.S. PATENT DOCUMENTS 2,800,343 7/1957 Ulrich .................. 137/614.04

FOREIGN PATENT DOCUMENTS

| 390556 | 9/1932 | Belgium . |
| 204970 | 7/1980 | Czechoslovakia . |
| 404368 | 10/1924 | Fed. Rep. of Germany . |
| 2363440 | 7/1974 | Fed. Rep. of Germany . |
| 2407052 | 8/1974 | Fed. Rep. of Germany . |
| 2624521 | 12/1976 | Fed. Rep. of Germany . |
| 2133846 | 12/1972 | France . |
| 1115856 | 2/1986 | Italy . |
| 612748 | 1/1975 | Switzerland . |
| 1292767 | 10/1972 | United Kingdom . |
| 1460112 | 12/1976 | United Kingdom . |
| 1594136 | 7/1981 | United Kingdom . |

*Primary Examiner*—Noah P. Kamen
*Attorney, Agent, or Firm*—Browdy and Neimark

[57] ABSTRACT

A heat exchanger, particularly a radiator for the heating of buildings is formed with a modular unit comprising a tubular finned element of extruded aluminum in which upper and lower headers of die-cast aluminum are engaged by an interference fit and a sealing O-ring gasket. The headers being connected through couplers by bayonet type coupling. The unit being completed passivated and/or anodized against corrosion.

18 Claims, 6 Drawing Sheets

HEAT EXCHANGER UNIT FORMED OF A PLURALITY OF MODULAR UNITS INCLUDING CONNECTION COUPLERS

BACKGROUND OF THE INVENTION

1. Field of the Invention

The present invention relates to a heat exchanger apparatus and a method for its manufacture.

The invention more particularly relates to a heat exchanger modular unit, the assembly of which together with similar modular units forms a heat exchanger apparatus.

The apparatus according to the invention is particularly useful as a radiator in hot water or steam heating plants for buildings. Consequently, for the sake of brevity in the following description, the term "radiator" will be used as a synonym for a heat exchange apparatus. However, this apparatus can be efficiently used also in a reverse mode for the cooling of rooms.

Still more particularly, the invention relates to a radiator manufactured from a material of extruded or die-cast anticorodal aluminium alloy which can be passivated in electrolytic bath.

2. Description of the Prior Art

Pig iron and steel radiators have been known for some time. These largely widespread radiators show the drawback of having a relatively low heat transfer coefficient (heat conduction coefficient 40 calories/$m^2$ hour 0° C.), so that they show a certain inertia in their heat transfer function and moreover they make a transfer by forced ventilation difficult, in that in such a case the low heat transfer coefficient becomes a controlling and restrictive factor.

Also known are the drawbacks due to difficulties in their transportation, assembly and installation in view of the excessive weight.

Aluminium is an ideal material due to the manufacturing of radiators for its high heat transfer capacity (heat conduction coefficient 175 calories/$m^2$, hour 0° C.).

Several approaches have been made in the prior art for manufacturing radiators of aluminium and alloys thereof.

The technical problem to be solved in this case is the difficulty of obtaining structural aluminium pieces suitable for radiators, by means of conventional methods of aluminium fabrication.

A further important problem is that in the operating conditions of the radiators, in contact with flowing water at a relatively high temperature, problems of corrosion arise in that the aluminium alloy structure and the various other metals in the plant with a different electric potential, produce electrode couples. These couples in the presence of hot water form a cell, the anode of which is aluminium. A process of corrosion is thus initiated, which is destined to produce holes.

Some prior art methods of manufacturing aluminium radiators, use aluminium alloy plates made by die-casting.

In order to be able to carry out die-casting, the prior art methods use an aluminium alloy containing considerable amounts of silicium (10 to 20%), as well as copper, iron, magnesium, and so on. Such silicium amounts are needed to obtain a sufficient fluidification of the melt which has to be cast in very thin thicknesses and into particularly large and complicated moulds.

A typical alloy used for this purpose is an alloy type UNI 5076. This is an aluminium-silicium-copper-iron alloy for die-casting (Si 12%, Cu 2%, Fe 0.7%). This alloy, however, due to such a high silicium content is particularly susceptible to corrosion, cannot be passivated in an electrolytic bath and consequently, not being electrically insulated, it is liable to form electrolytic couples, so that the initiation of the corrosion process is only a matter of time and unavoidable.

Moreover the heat conduction coefficient is considerably lower than that of pure aluminium, being known that silicium is the most efficient thermic insulator.

These characteristics led to the consequence that this type of aluminium alloy radiator has not met with success.

In British Pat. No. 1292767 a radiator is described having the radiant elements made of extrudates of aluminium alloy. The structure of this radiator comprises, however, pieces of different materials, such as an inner copper coating, headers, the material of which is not specified, and tie rods of steel for connecting the headers and the radiant elements. This radiator does not solve the problem of having a reliable aluminium radiator due to the contact between materials of different nature, the large number of pieces which are to be assembled and the difficulty of the same assembly.

In British Pat. No. 1460112 a different type of radiator is described made of an aluminium alloy.

The modular unit of this radiator comprises a tubular element provided with longitudinal fins consisting of an extruded piece of substantially pure (98–98% Al) aluminium alloy and a pair of T-shaped headers consisting of a die-cast piece of an aluminium alloy having a low silicium content (about 2–4% Si) engaged through forced fit to the ends of the tubular element.

The connection of adjacent units is made by a connection coupler of aluminium alloy which engages a horizontal branch of the T headers in adjacent units, through threads having opposite directions, a sealing gasket being interposed between the two headers. The two branches of each header are thus provided with threads of opposite directions.

An improvement of the above described radiator is illustrated in the Italian Pat. No. 1115856. This patent refers that the tubular element and the T shaped headers are welded with an outer welding bead and moreover the extrudate is anodised and the die-cast is passivated in an electrolytic bath.

The radiator of the Italian Pat. No. 1115856 solves the problem of providing a radiator made completely of aluminium, without supports or tie rods made of different metals, which is not subjected to corrosion in operation and does not produce leakage with time.

The manufacturing of the two basic elements of the radiators using different aluminium alloys permits the use of different forming methods, with advantage. The tubular element is easily produced by extrusion of substantially pure aluminium, by means of dies providing the desired shape with the advantage of having the radiating element with a high heat transfer coefficient and which can be anodized. The header element is sufficiently small and thick to be able to be obtained by means of die-casting from an aluminium alloy having a considerably low silicium content, which can be passivized by treatment in an electrolytic bath. In that way the inner canals of the radiator are protected from corrosion.

The above illustrated radiator meets the requirements for practical use and provides all the advantages of an aluminium radiator.

However, the method of fitting the tubular elements and the headers together and of the headers one to the other for assembly of a radiator, is not suitable for manufacture of the radiator in a factory through a completely automatic process.

Carrying out the welding and threading of headers and couplers in factory, in fact, raises some problems.

The welding operation is particularly difficult because of the two different alloys employed and their different molecular cohesion (extrudte and die-cast). Moreover, it involves a careful control of the working parameters, the use of peculiar welding torches in view of the narrowness of the space, and it can produce in the tubular element deformations due to thermal stress which could affect the sealing and the perfect allignment and distance of the axis of the headers fitted into the radiant element, due to the shrinkage of the welding baths. Consequently this operation is to be controlled with employment of manpower. Moreover, possible defects as deriving from any welding process, can be added: porosity, cracks, embedded gas, modification of the alloy homogeneity, and so on. Such drawbacks do not ensure a 100% reliable water sealing.

The presence of threads involves a careful control by precision instruments, of their allignment with the longitudinal axis of the upper and lower headers, in that this is the necessary condition for a good fit of adjacent units through the couplers. This operation again cannot do away with human intervention.

On selecting the aluminium alloy for the headers of the prior art radiators, it was not possible to use a percentage of aluminium higher than 98%. Such higher percentage would be advantageous in that it would permit treatment of the workpiece in an anodic oxidation process to make it electrically insulated. However, such an alloy would not permit a working of the threads on a commercial scale, in that the alloy itself would become too soft and the threading tools would soon be jammed by pasty chips.

SUMMARY OF THE INVENTION

The present invention solves the problem of manufacturing an aluminium radiator of the above described type, by means of operations which can be completely automatized and by realizing the couplings and connections in a unique and simple way with respect to the prior art.

To this object, the tubular element of a radiator unit is formed from an extrudate of an anodizable anticorrosion plastic working primary aluminium alloy and it has an inner longitudinal canal and outer fins, the T shaped header elements are die-casts of an anti-corrosion casting primary aluminium alloy which can be passivated in an electrolytic bath and they are mounted by telescopical engagement with interference fit into each end of the tubular end in communication relationship with the inner canal thereof. Connection couplers sealingly join one to the other headers of adjacent units, to form a heat exchanger, said heat exchanger being characterized in that the header element comprises, on the outer surface of the vertical branch of the T shape, an abutment for an abutment engagement with an end portion of the tubular element, a circular groove adjacent to said abutment and an O-ring gasket housed in said circuler groove; the tubular element having tapered and bent ends to be sealingly engaged to said O-ring, and moreover the header element of a radiator unit comprises, on the outer surface of the horizontal branch of the T shape, a plurality of pins for the engagement with said couplers, and said connection couplers are provided with cam slots having an open end at one end of said coupler and an inclined flank directed to the middle of the nipple, starting from said open end, for a cam force fit between said piece of the header element and said flank of the cam slot, for bayonet coupling header connectors of adjacent units.

For the die-casting fabrication of the headers according to the present invention, an aluminium alloy can also be used with an aluminium content higher than 98%, which makes a treatment of anodic oxydation possible.

The invention relates also to a method which can be completely automatic, for the manufacturing of a heat exchange unit of the type previously defined, and comprising: mesure cutting from an extruded commercial bar said tubular element and milling its ends to form said tapered ends; producing said header element by die-casting and housing a O-ring gasket into said circular groove of the header element; inserting said header element into the tubular element with an interference fit until said abutment rests on the end of the tubular element; and bending said tapered end towards said header to fix said gasket.

DESCRIPTION OF THE PREFERRED EMBODIMENT

Figure 1:
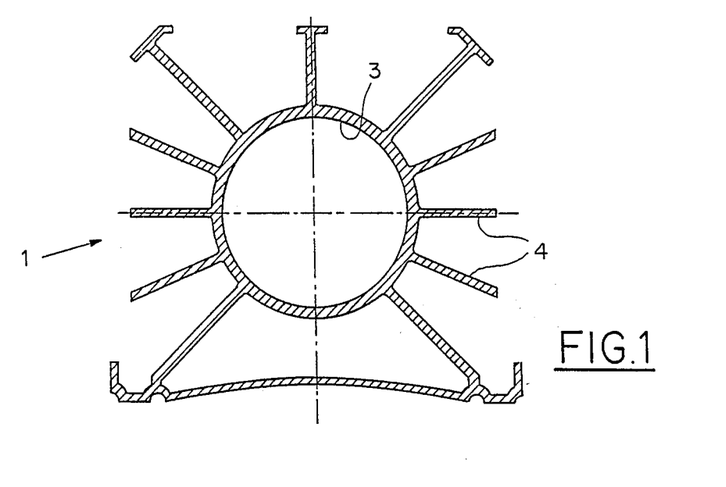
FIG. 1 is a cross section view of a tubular element of the radiator.
Figure 2:
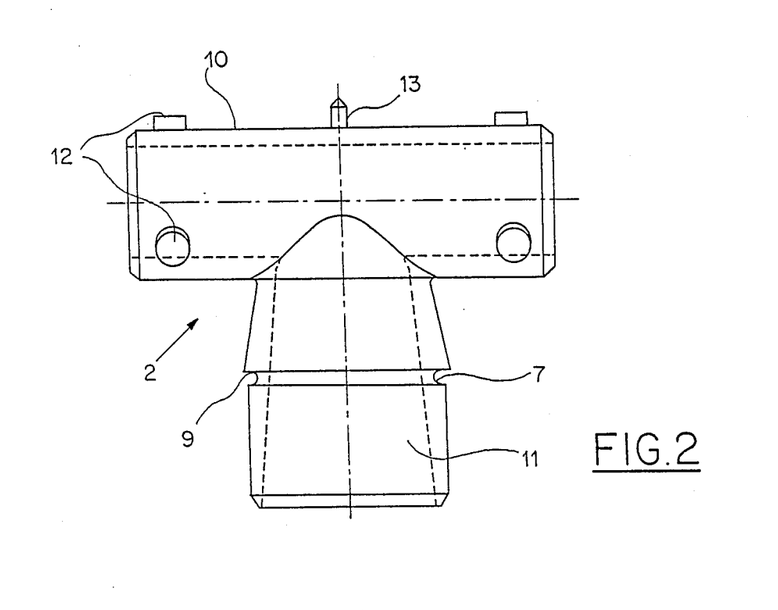
FIG. 2 is a front view of a T header.
Figure 3:
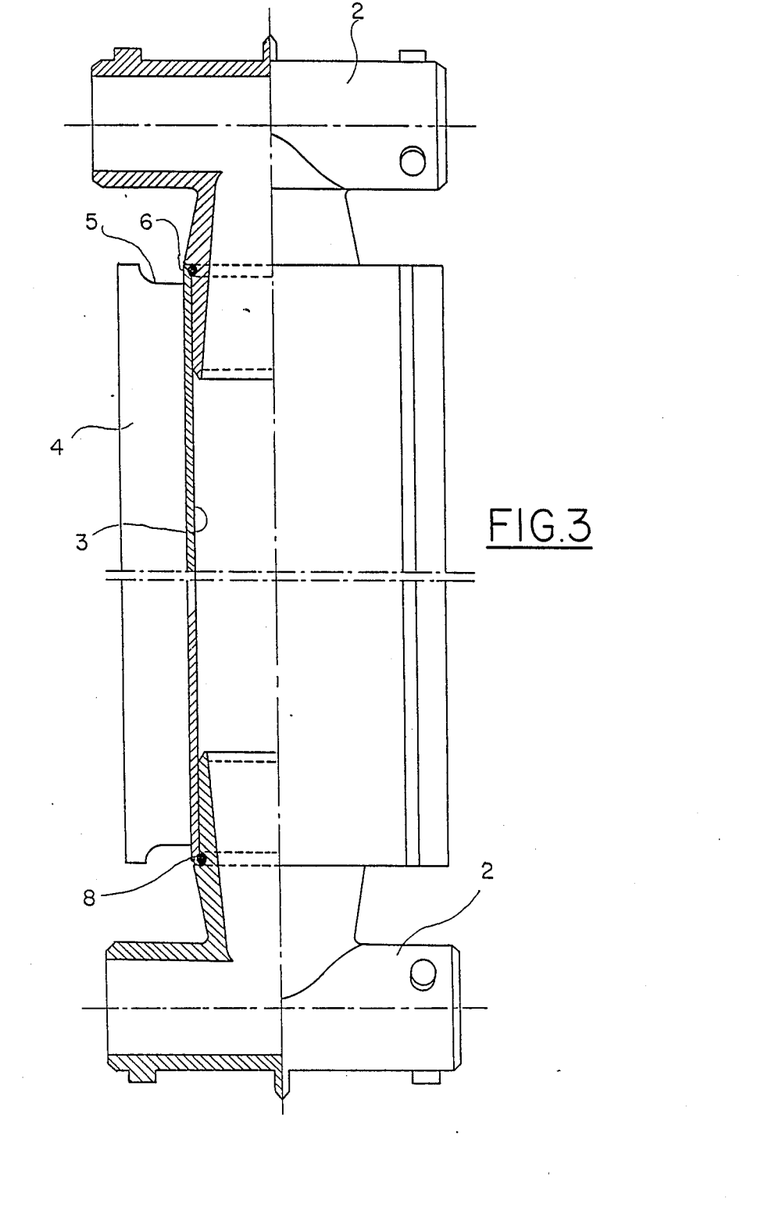
FIG. 3 shows the tubular element of the radiator with the T headers mounted thereon.

The heat exchanger unit comprises a tubular element 1 (FIGS. 1 and 3) and T shaped headers 2 (figures 2 and 3).

The tubular element 1, shown in a cross section in FIG. 1, is formed with a tube 3 and radiant fins 4. It is made from an aluminium bar extruded from a die, for example of the shape shown in FIG. 1. The diameter size of the tube 3 can vary in function of the type of plant depending on the cycle flow rate of the liquid, its temperature, water or steam operation, application of a forced convector and so on.

The tubular element is cut from extruded bars of a commercial length of 6–7 meters, according to the desired interaxis between the headers. The radiant surfaces 4 are homogeneously arranged around the tube internally wetted by the heating or cooling liquid, forming convective canals for an optimum heat exchange with the room air.

According to the invention, after the measure cutting of the tubular element, a circular portion of the fins about the upper and lower ends of tube 3 is removed by a milling machine, so producing recesses 5 in the fins, for a depth of about 5 mm. Additionally the upper and lower ends of the tube 3 are tapered from the inner surface to the outer surface of the tube. This tapering is indicated in 6 on top of FIG. 3.

As said hereinbefore, the aluminium extrudate consists of substantially pure aluminium in an anodisable, anticorrosion, plastic working primary alloy. Representative alloys of this type are those known under the denomination anticorodal.

Examples are:

Anticorodal 063, containing 0.7% Mg, 0.4% Si, designated under the Italian standards as PALMgSi-UNI 3569-66 which correspond to USA A.A. designation 6063 and DIN 1712-1725 ALMgSi 0.5.

Anticorodal 100, containing 1% Si, 0.6% Mg, 0.3% Mn designated as $PALSi_1MgMn-UNI3571$, corresponding to USA A.A. designation: 6351 and DIN 1712-1725: $ALMgSi_1$.

The tubular element is then internally and externally anodized with desired colours, as are all the outer components of the apparatus.

The headers 2 are produced by die-casting and they consist of an anti-corrosion, casting primary aluminium alloy which can be passivated in an electrolytic bath or can be anodized by an anodic oxydation process. Typical examples of these alloys are also known under the designation anticorodal, such as a primary aluminium alloy containing 2% Si, 0.7% Mn, 0.75% Mg having the designation under the Italian standards $G-LSi_2MnMg$-UNI 3055.

Such alloys are suitable only for manufacturing small pieces with thick walls. The passivating, together with the anodization, serves the purpose of electrically insulating the entire apparatus and inhibiting the formation of electrolytic couples which, in the presence of water, are the principal cause of corrosion effects.

The headers 2 are consequently passivated in an 0X electrolytic batch or anodized, depending on the alloy used.

According to the invention the headers 2 are provided with a circular groove 7 on the vertical branch 11 of T shape, adapted to receive an O-ring gasket 8 of a synthetic material having characteristics of chemical resistance, duration, chemical stability and inertia at low and high temperatures ($-40°$ C. to $+150°$ C.). A suitable material in this case is an ethylene propylene elastomer.

On the same vertical branch of the header, an abutment 9 is additionally provided as obtained with said groove 7 at a 2 cm distance from the horizontal branch 10 of the T.

The headers 2, provided with gaskets 8 and calibrated, are inserted into the upper and lower ends of the tubular element 1, with an interference fit, until the abutment 9 rests on the tip of the tapering 6. As an example, the fit can have an interference overcome by a thrust of 12000 Kg. The tapered portion 6 of the tube 3 makes a soft contact possible with the O-ring gasket 8 so as not to force or in any way modify the position thereof on its seat.

The tapered portions 6 are then deformed by means of a bending operation against the headers. Bending can be carried out by a particular tool, to the purpose of also obtaining a perfect hydraulic sealing, as shown on the lower portion of FIG. 3.

As can be noted, the horizontal branch 10 of the headers 2 is provided with pins 12 (in the illustrated example in the number of 3) which are placed symmetrically near the lateral ends. On the top and at the middle of the horizontal branch 10 an embossment 13 is also provided which aids in fixing the closure caps, as will be described hereinafter.

Observing FIG. 3, it can be understood that the tubular element 1 forms a unit of a heat exchanger with a vertical passage of exchange fluid, whereas the upper and lower headers provide for the input and output of the fluid itself. The radiator will consist of a plurality of units formed as that shown in FIG. 3.

Figure 4:
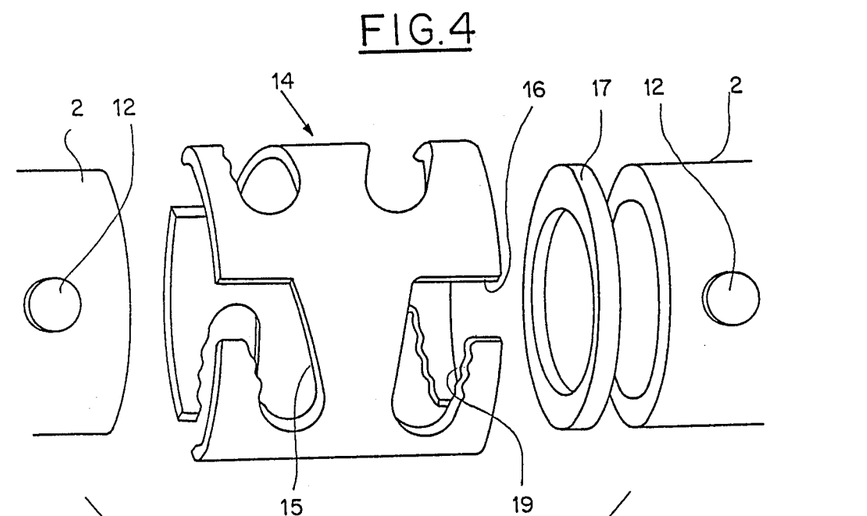
FIG. 4 is a perspective view showing an embodiment of the connection coupler.
Figure 5:
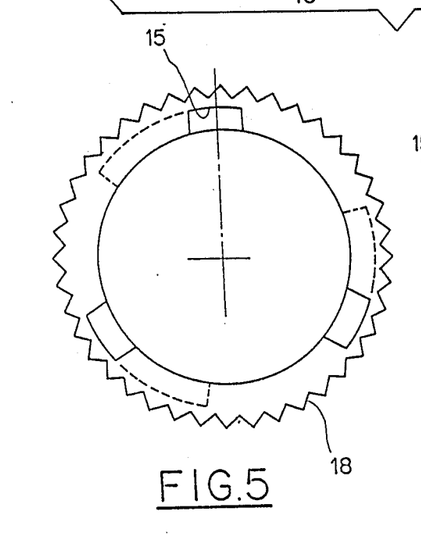
FIG. 5 is a side view of another embodiment of the connection coupler.
Figure 6:
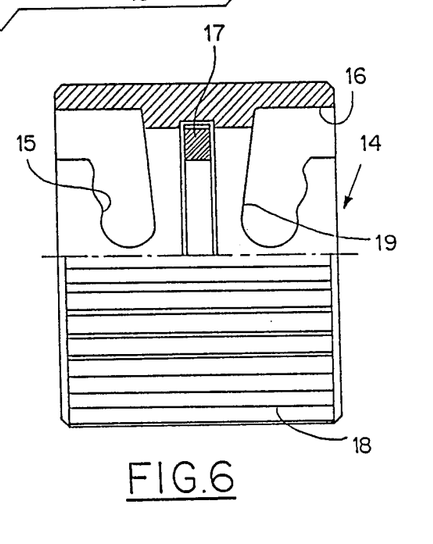
FIG. 6 is a front view, partially in a cross-section, of the coupler shown in FIG. 5.

For the connection of these units for the purpose of forming a complete radiator, according to the invention, connection couplers 14 are used (FIGS. 4 to 6). The connection couplers can be produced from an externally splined extruded aluminium bar or they can be made by means of aluminium die-casting. They can also be made of a suitable plastic material, such as that known under the denomination ertalon, vulkollan.

The couplers 14 are internally provided with pairs of slots or apertures 15, each pair being inclined in opposite directions, said pairs being symmetrically displaced in accordance with the pins 12 on the headers 2. The slots or apertures 15 are open to the outer ends of the coupler 14, as indicated in 16 in figure 4. The slots or apertures 15 are to be engaged with the pins 12 of the headers 2, so that a rotation of the coupler and the opposite inclination of each pair produces an approaching of the facing ends of two headers 2. A sealing gasket 17 is interposed between two headers.

A preferred embodiment of the couplers is illustrated in FIGS. 5 and 6, in which slots 15 are provided which are not visible from the exterior. In this case the thickness of the coupler can be about 5 mm and the slots have such a length as to allow a rotation by an angle of about 120° for the connection of headers provided with three pins 12.

Consequently the connection of the headers is through a "bayonet system", which is sufficiently simple, precise and reliable for the assemling of the radiators.

Figure 8:
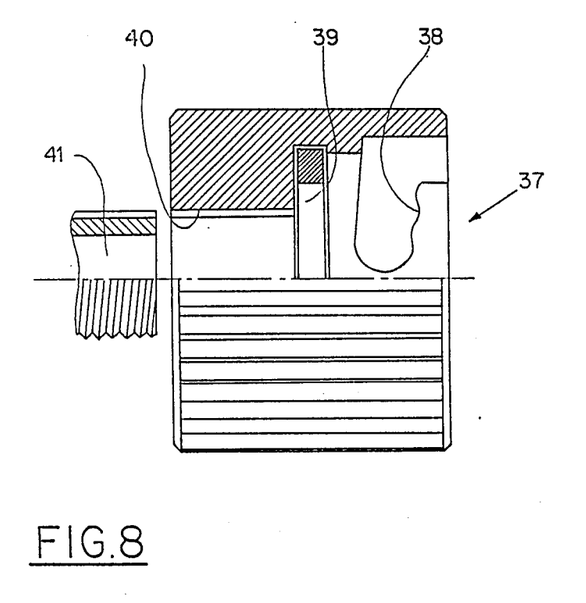
FIG. 8 shows an adapter for the connection of a radiator according to the invention to the plant.

The inclination of the flanks of slots 15 is calculated for having a forced engagement between the flanks and the pins 12 and obtaining a stable junction. To improve such engagement, the flanks of the slots 15 can be provided with corrugations, as indicated in 19 on figure 4, for increasing friction. In a similar way the connection of the radiator to the plant is carried out by means of adaptors 37 (FIG. 8) which are provided with the same bayonet system as the couplers, comprising a slot 38 with an inclined flank and a gasket 39. The other end of the adaptor is provided with a thread 40 which can be threaddedly engaged through a connection tube 41 to the plant for the water circulation.

Figure 7:
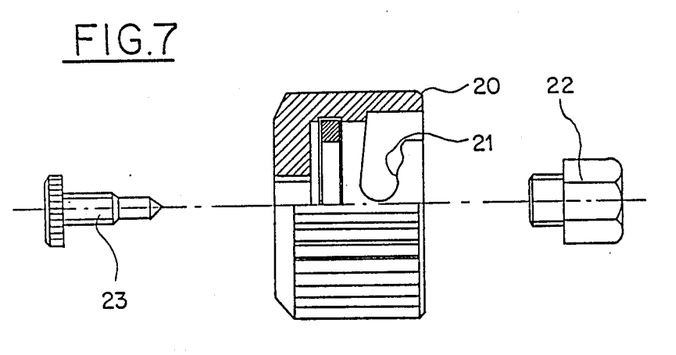
FIG. 7 shows a plug for the lateral closure of the headers.

The headers at the ends of the radiator are closed by means of closure plugs provided again with the bayonet system illustrated for the couplers. An embodiment of closure plug 20 is shown in FIG. 7 with its slot 21 and a vent valve system formedd with a holed nut 22 and a pin screw 23.

The headers of the individual radiators are concealed by means of upper and lower caps 24 (FIGS. 9 and 10) with front, rear and upper walls, which can also be obtained from an extruded aluminium bar and blanked as desired into various designs for allowing the air to pass. The caps 24 can also be obtained from an aluminium sheet, punched according to particular aperture shapes harmonizing with the design of the radiant element. The caps can also be made of moulded plastic material, ABS as an example.

Figure 9:
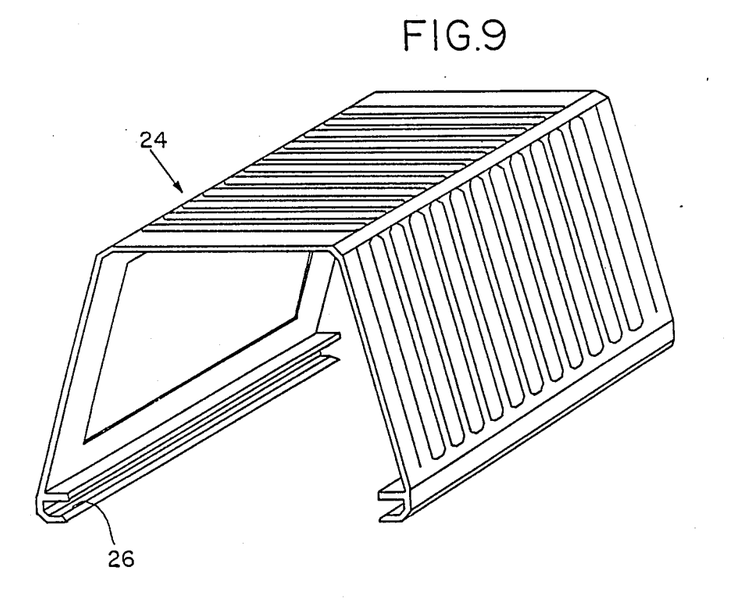
FIG. 9 shows an embodiment of an upper closure cap.
Figure 10:
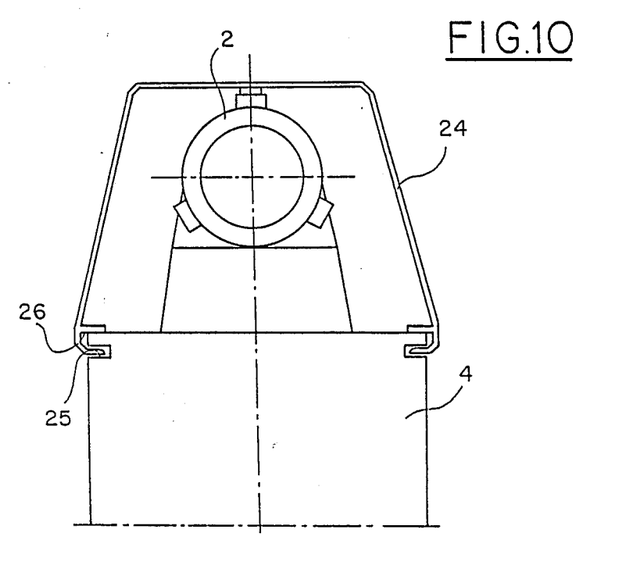
FIG. 10 shows the cap applied on the radiator.

Securing of the caps 24 to the radiant element is obtained by means of two slits 25 provided in the fins 4 of the tubular element 1, in which inner fins 26 of the cap 24 are inserted. The embossment 13 of the header 2 aids in centering the cap 24 on the unit, avoiding a sliding thereof.

The herein described radiator can be provided with an "active convector", which has the function of promoting, directing and forcing the passage of room air in the canals of the radiating units.

Figures 11, 11B:
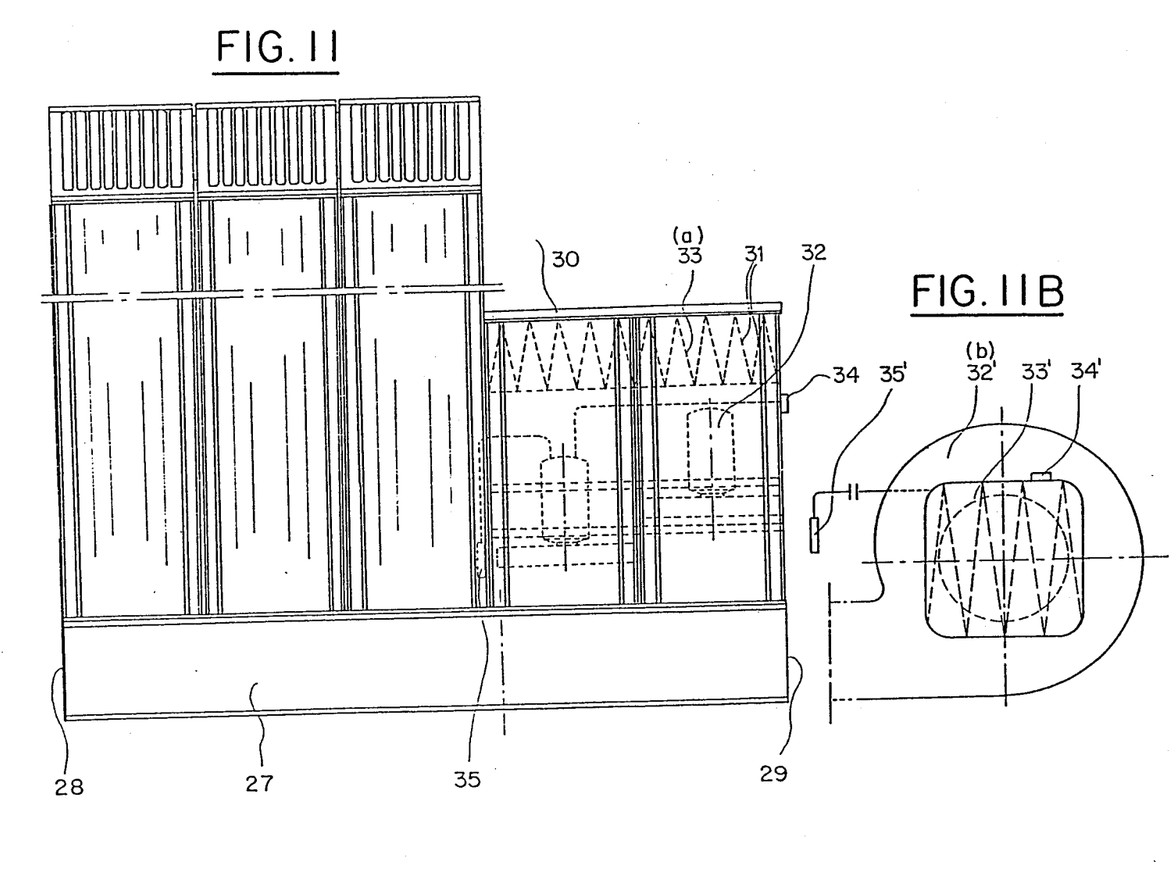
FIGS. 11 and 11B shows two embodiments of a forced ventilation system coupled to the radiator of the invention.

Referring to FIG. 11, the active convector is embodied as a canal 27 of anodized extrudated aluminium, having a shape similar to the caps 24, but with no apertures and having the same length as the entire radiator, prolonged with a length of two units. The ends of the canal 27 are closed by closure walls 28, 29, which extend to the entire height of the radiator. The canal 27 is applied on the lower part of the radiator, in lieu of the caps. The canal forms an air guide. On the length of the guide which projects from one of the sides, opposite to the side where the radiator is connected to the plant, a pair of dummy units of extruded elements are inserted, formed by a parellepipedal tube 30, 31 each containing, typically, an electric fan 32, an air filter 33 and a switch 34 as shown on part (a) of figure 11. These components have the following function: putting the convector into operation by means of the switch; providing a pressure air column which is directed into the canal 27 and will be diffused in the convective canals of the radiators by means of the fans 32; automatic switching on and off by means of the thermostat 35 calibrated at about 40° C., as well as cleaning of the room air by means of the air filter 33.

These components which produce the air column directed into the canal 27, can also be housed in a container of different shape, as shown on part (b) of FIG. 11, in which elements analogous to the part (a) are indicated by the same reference numerals with an apex.

The heat exchanger or radiator can operate with hot water or low pressure steam for room heating, or with a cooling liquid for room cooling and it can be provided with the active convector or operate without it.

The advantages of the present invention are as follows:

absence of weldings;

extreme ease of assembly of the elements forming the radiator;

allowability of adding or removing elements from the assembled group, without dismantling the same from the plant, thanks to the peculiar outer connecting nipples which do not have right or left threads;

use of the properties of anticorodal extruded aluminium which additionally to the high conducibility, permits a treatment of inner and outer anodization, providing assurance of reliability during time; such reliability is to be attributed to the aluminium oxide (electrolytic bath) which has, among its characteristics, a particularly high hardness (corundum) and a complete electric insulation which inhibits any formation of electrolytic couples; these advantageous characteristics can be obtained also for the headers, in that for them an alloy having an aluminium content higher than 98% can be used;

a high thermal efficiency which can also be increased by forcing filtered air from the environment into the radiator both when the apparatus operates as a heater and a cooler;

fast recycling of the heating or cooling liquid, due to the headers having a constant cross section and perfectly smooth inner surfaces;

sturdiness of the assembled exchanger obtained by couplers which engage the headers through their entire extent;

possibility of realizing radiators of any height;

possibility of an easy cleaning of the heater exchanger, in that on removing the caps an inner cleaning of the elements and washing of the same caps is possible;

possibility of mounting the radiator with right or left feeding, provided by the adaptors and bayonet engaged plugs;

possibility of manufacturing the radiator unit by a completely automatic machine with no intervention of manpower;

possibility of manufacturing the connection nipples, adaptors, plugs and caps by automatic machines with no intervention of manpower.

I claim:

1. Heat exchanger unit for the climatization of buildings, in which an extruded tubular element of radiator of an aluminum alloy adapted for extrusion, has an inner longitudinal canal and outer fins, die-cast T-shaped header elements of die-casting aluminum alloy are mounted by means of an interference engagement on each end of the tubular element in fluid communication with the inner longitudinal canal of said tubular element, and connection couplers sealingly connect headers of adjacent units to each other to form a heat exchanger characterized in that the header element comprises on the outer surface of the vertical branch of T shape, an abutment for an abutment engagement with an end portion of the tubular element, a circular groove adjacent to said abutment and an O-ring gasket housed into said circular groove, the tubular element having the end portion thereof tapered and bent which is sealingly engaged to said O-ring;

said header element further comprises, projecting from the outer surface of the horizontal branch of the T shape, a plurality of pins for engagement with said couplers;

and said connection coupler is provided with cam slots with an open end at the end of said coupler and an inclined flank directed to the middle of the coupler from said open end, for a cam force fit of said pins on the header elements and said flank on the cam slots, in a bayonet coupling of header elements of adjacent units.

2. A unit according to claim 1, in which said pins on the header element and said slots in the coupler are in a number of three, placed in symmetrical relationship.

3. A unit according to claim 1, in which said flank of the slot in the coupler which is engaged with one of said pins, has a corrugated conformation for forming rest positions for said pins.

4. A unit according to claim 1, in which the fins have an indented portion adjacent said tapered end.

5. A unit according to claim 1, in which said aluminum alloy of which the extruded tubular element is made, is an anti-corrosion, anodizable, anticorodal primary aluminum alloy for plastic working and the inner and outer surfaces of said element are anodized.

6. A unit according to claim 1, in which said aluminum alloy of which said header element is made, is a casting primary aluminum alloy which enables the inner and outer surfaces of the header element to be passivated in an electrolytic bath or an anodic oxidation treatment.

7. A unit according to claim 6, in which said alloy has an aluminium content higher than 98%.

8. A unit according to claim 1, in which said connection coupler is of extruded aluminium alloy and said slots are milled onto it.

9. A unit according to claim 1, in which said connection coupler is a die-cast piece of aluminium alloy or plastic material.

10. A heat exchanger formed by a plurality of heat exchanger units as defined in claim 1, assembled through said couplers.

11. A heat exchanger according to claim 10 further comprising closure plugs and adapters for connection to a network of a climatization plant, said plugs and adapters being provided with slots shaped similarly to those of said couplers, for the connection with a respective end of said headers.

12. A heat exchanger according to claim 10, in which the fins of the tubular ends are arranged vertically and have horizontally aligned slits in correspondance with upper and lower end portions of said fins and further comprising upper and lower caps provided with projections for engagement with said slits, said caps being formed with a front, rear and upper wall and openings for the passage of air.

13. A heat exchanger according to claim 12, in which said caps are of extruded aluminium alloy.

14. A heat exchanger according to claim 12, in which said caps are punched sheets of aluminium alloy.

15. A heat exchanger according to claim 12, in which said caps are made of moulded plastic material.

16. A heat exchanger according to claim 10, comprising an air guide formed with a lower cap with no openings and a closure wall at one end of said cap, said guide being connection at the other end to a forced ventilation system to improve heat exchange with the air in the room.

17. Heat exchanger according to claim 16, in which said forced ventilation system comprises an electrical fan, a thermostat for controlling said fan and a filter for filtering the air inlet into said guide.

18. Heat exchanger unit for the climatization of buildings, in which an extruded tubular element of radiator of an aluminum alloy adapted for extrusion, has an inner longitudinal canal and outer fins, die-cast T-shaped header elements of a casting aluminum alloy are mounted by means of interference engagement on each end of the tubular element in fluid communication with the inner canal of said tubular element, and connection couplers sealingly connect the headers of adjacent units to each other to form a heat exchanger, characterized in that the header element comprises on the outer surface of the vertical branch of the T shape, an abutment for an abutment engagement with an end portion of the tubular element, a circular groove adjacent to said abutment and an O-ring gasket housed into said circular groove, the tubular element having tapered and bent end portions which are sealingly engaged with said O-ring.

* * * * *